(12) United States Patent
Kim et al.

(10) Patent No.: US 12,493,737 B2
(45) Date of Patent: Dec. 9, 2025

(54) INTEGRATED MANAGEMENT DEVICE BASED ON BIG DATA PLATFORM, METHOD AND SYSTEM

(71) Applicant: ARCHIVSOFT CO., LTD., Goyang-si (KR)

(72) Inventors: Ji Sung Kim, Goyang-si (KR); Jong Eun Chae, Goyang-si (KR)

(73) Assignee: ARCHIVSOFT CO., LTD., Goyang-si (KR)

( * ) Notice: Subject to any disclaimer, the term of this patent is extended or adjusted under 35 U.S.C. 154(b) by 142 days.

(21) Appl. No.: 18/493,158

(22) Filed: Oct. 24, 2023

(65) Prior Publication Data
US 2025/0094698 A1 Mar. 20, 2025

(30) Foreign Application Priority Data
Sep. 20, 2023 (KR) .................. 10-2023-0125392

(51) Int. Cl.
*G06F 40/00* (2020.01)
*G06F 16/28* (2019.01)
(Continued)

(52) U.S. Cl.
CPC .......... *G06F 40/18* (2020.01); *G06F 16/284* (2019.01); *G06F 40/106* (2020.01); *G06V 30/19* (2022.01); *G06V 30/412* (2022.01)

(58) Field of Classification Search
CPC ...... G06F 40/18; G06F 16/284; G06F 40/106; G06V 30/19; G06V 30/412
See application file for complete search history.

(56) References Cited

U.S. PATENT DOCUMENTS 6,970,881 B1 * 11/2005 Mohan .................... G06F 16/36
707/999.102
8,126,892 B2 * 2/2012 Chakravarthy ... G06F 16/24573
707/705
(Continued)

FOREIGN PATENT DOCUMENTS

CN 107515887 B * 1/2021 ........... G06F 16/903
CN 113377850 A * 9/2021
(Continued)

OTHER PUBLICATIONS

Network Academy.io, "RESTful APIs", Jan. 28, 2022, 7 pages https://web.archive.org/web/20220128202252/https://www.networkacademy.io/ccie-enterprise/sdwan/cisco-sd-wan-rest-apis.*
(Continued)

*Primary Examiner* — Wilson W Tsui
*Assistant Examiner* — David Faber
(74) *Attorney, Agent, or Firm* — Studebaker Brackett PLLC

(57) ABSTRACT

The present disclosure relates to an integrated management device on a big data platform. The integrated management device includes a processor that extracts a text and table in an image file and in a Portable Document Format (PDF) file, inputs unstructured data related to the text and table in the image file and in the PDF file into an Artificial Intelligence (AI) model, and stores the structured data that is outputted from the AI model in a relational database in a key and value form, perform an integrated search on the unstructured data and the structured data in a requested public data when a search request for the requested public data among the pieces of public data is received from a user terminal, obtains found public data in response to the integrated search being performed, and displays the found public data through the user terminal.

10 Claims, 13 Drawing Sheets

(51) Int. Cl.
  *G06F 40/106* (2020.01)
  *G06F 40/18* (2020.01)
  *G06V 30/19* (2022.01)
  *G06V 30/412* (2022.01)

(56) References Cited

U.S. PATENT DOCUMENTS

| | | | |
|---|---|---|---|
| 8,725,604 B2* | 5/2014 | Knighton | G06Q 10/06 715/213 |
| 10,140,322 B2* | 11/2018 | Donneau-Golencer | G06F 16/3329 |
| 11,049,235 B2* | 6/2021 | Wheaton | G06F 16/93 |
| 2013/0275383 A1* | 10/2013 | McLarty | G06Q 10/107 707/670 |
| 2018/0293400 A1* | 10/2018 | Borup | G06F 21/554 |
| 2020/0019713 A1* | 1/2020 | Varga | G06F 9/505 |
| 2021/0125034 A1* | 4/2021 | Nguyen | G06N 3/084 |
| 2021/0160221 A1* | 5/2021 | Barmpalios | G06F 21/6245 |
| 2022/0121708 A1* | 4/2022 | Burnett | G06F 16/9038 |
| 2023/0065915 A1* | 3/2023 | Berestovsky | G06V 30/1448 |
| 2024/0062019 A1* | 2/2024 | Aberle | G06N 3/0475 |
| 2024/0153299 A1* | 5/2024 | Pillai | G06V 30/41 |
| 2025/0005950 A1* | 1/2025 | Bilgen | G06V 30/19147 |

FOREIGN PATENT DOCUMENTS

| | | | | |
|---|---|---|---|---|
| CN | 115087968 A | * | 9/2022 | |
| CN | 116010619 A | * | 4/2023 | |
| CN | 117033661 A | * | 11/2023 | G06F 16/335 |
| KR | 10-2012-0030389 A | | 3/2012 | |
| KR | 10-2015-0089868 A | | 8/2015 | |
| KR | 102024164 B1 | * | 9/2019 | |
| KR | 10-2022-0066737 A | | 5/2022 | |
| KR | 10-2022-0091676 A | | 7/2022 | |
| KR | 102561878 B1 | * | 8/2023 | |
| KR | 20240126220 A | * | 8/2024 | |
| KR | 20240131061 A | * | 8/2024 | |
| WO | WO-2022102827 A1 | * | 5/2022 | G06F 40/295 |
| WO | WO-2023091522 A1 | * | 5/2023 | G06F 16/93 |
| WO | WO-2024044011 A1 | * | 2/2024 | G06F 16/3329 |

OTHER PUBLICATIONS

Wallarm, "SDK vs. API: What's the Difference?", Feb. 3, 2023, 10 pages https://web.archive.org/web/20230203135420/https://www.wallarm.com/what/sdk-vs-api-whats-the-difference.*

McQuillan, "SDK vs. API: What's the Difference?" Aug. 18, 2023, 18 pages https://budibase.com/blog/app-building/sdk-vs-api/.*

The Postman Team, "What Is a REST API? Examples, Uses, and Challenges", Jun. 28, 2023, 12 pages https://blog.postman.com/rest-api-examples/.*

SKDs.io, "A Guide to Creating SDKs for RESTful APIs", Mar. 29, 2023, 1 page https://web.archive.org/web/20230329224505/https://sdks.io/docs/best-practices/overview/.*

Stream, "API vs. SDK: The Difference Explained (with Examples)", Feb. 1, 2023, 7 pages https://getstream.io/glossary/api-vs-sdk/ https://web.archive.org/web/20230201200813/https://getstream.io/glossary/api-vs-sdk/.*

Segal, "Big Data", Feb. 16, 2022, 7 pages https://web.archive.org/web/20220216150609/https://www.investopedia.com/terms/b/big-data.asp.*

Splunk, "Creating searches using the REST API", Feb. 11, 2015, 3 pages https://web.archive.org/web/20150211211831/https://docs.splunk.com/Documentation/Splunk/latest/RESTTUT/RESTsearches.*

Redhat, "What is a REST API?" Oct. 21, 2020, 6 pages https://web.archive.org/web/20201021004200/https://www.redhat.com/en/topics/api/what-is-a-rest-api.*

An Office Action mailed by the Korean Intellectual Property Office on Apr. 8, 2025, which corresponds to Korean Patent Application No. 10-2023-0125392 and is related to U.S. Appl. No. 18/493,158, 14 pages.

A. Neumann, N. Laranjeiro and J. Bernardino, "An Analysis of Public REST Web Service APIs," in IEEE Transactions on Services Computing, vol. 14, No. 4, pp. 957-970, Jul.-Aug. 2021.

* cited by examiner

FIG. 9

| Content | Statistics and history | View request | System management |

> Content

Content
Video
- Image
- Document
- Etc

Detailed page of content

| Registration date | **--** |
|---|---|
| Title | ************** |
| File type | *** |
| Responsible department | ***** |
| Person in charge | ***** |
| Location | ****** |
| Show / hide | ** |
| Descriptions | *** * ** **** |

Attachment

| File name | | File size | Extension | Download |
|---|---|---|---|---|
| P4 .png | | 54815KB | PNG | Selection |
| P16 .png | | 78946KB | PNG | Selection |

Modify   List

Person

FIG. 13

| | Content | Statistics and history | View request | System management |

> Content

Content
-Video
-Image
-Document
-Etc

Content registration

I Basic data

| | |
|---|---|
| Registration date | [ 📅 ] |
| Title | [ ] |
| File type | [ Select ▽ ] |
| Responsible department | [ Entire ▽ ] |
| Person in charge | [ ] |
| Location | [ ] |
| Attachment | [ ] |
| Show / hide | ●Show ○Hide |
| Descriptions | [ ] |
| Add item | [ Selection ] |

[ Register ]  [ List ]

INTEGRATED MANAGEMENT DEVICE BASED ON BIG DATA PLATFORM, METHOD AND SYSTEM

CROSS-REFERENCE TO RELATED APPLICATIONS

A claim for priority under 35 U.S.C. § 119 is made to Korean Patent Application No. 10-2023-0125392 filed on Sep. 20, 2023 in the Korean Intellectual Property Office, the entire contents of which are hereby incorporated by reference.

BACKGROUND

Embodiments of the inventive concept described herein relate to an integrated management device based on a big data platform, a method thereof, and a system using the same.

Conventionally, OCR-based unstructured data conversion devices have been used only to store extracted texts in a relational database.

In other words, the conventional OCR-based unstructured data conversion devices have not performed a function of extracting, identifying, and utilizing texts and tables in an image file and a PDF file.

Moreover, the conventional OCR-based unstructured data conversion devices have lacked a system for data management and linkage, and work hours of workers have increased due to manual work in data collection and analysis.

Furthermore, because it is difficult to hire experts in each field to process data into data in a desired form, the conventional OCR-based unstructured data conversion devices have not systematically managed big data.

Accordingly, nowadays, research on improved data management devices capable of efficiently performing a function of accurately extracting, identifying, and utilizing texts and tables in image files and PDF files has been continuously conducted.

Besides, nowadays, the system for data management and linkage has been improved and work time has been shortened through automation of data collection and analysis. Research on improved data management devices capable of systematically managing big data by processing data into data in the desired form has been continuously conducted.

SUMMARY

Embodiments of the inventive concept provide a device that may efficiently perform a function of accurately extracting, identifying, and utilizing texts and tables in image files and PDF files.

Embodiments of the inventive concept provide a device that may improve a system for data management and linkage.

Embodiments of the inventive concept provide a device that may shorten work time by automating data collection and analysis.

Embodiments of the inventive concept provide a device that may systematically manage big data by processing data into data in a desired form.

Problems to be solved by the inventive concept are not limited to the problems mentioned above, and other problems not mentioned will be clearly understood by those skilled in the art from the following description.

According to an embodiment, an integrated management device based on a big data platform includes a communication unit that communicates with a big data collection device and a user terminal, and a processor electrically connected to the communication unit and controlling an operation related to integrated management based on the big data platform. The processor includes an extraction module that extracts a text and a table in an image file of pieces of public data and a text and a table in a PDF file of the pieces of public data among big data, which is received from the big data collection device, through the communication unit by using AI OCR, a preprocessing module that inputs unstructured data related to the text and the table in the image file and the text and the table in the PDF file into an AI model, and performs preprocessing to store structured data in a form of key and value, which is learned and output based on the AI model, in a relational database, a search interface module that performs an integrated search on unstructured data and structured data in a requested public data based on SDK and RestfulAPI when a search request for the requested public data among the pieces of public data is received from the user terminal, and a display interface module that displays the found public data through the user terminal.

Moreover, the search interface module may perform an integrated search linked to a search engine on the unstructured data and the structured data in the found public data based on the SDK and the RestfulAPI.

Furthermore, the processor may further include a generation module that generates an Excel file having a dynamic layout with respect to structured data corresponding to the text and the table in the image file and the text and the table in the PDF file in the found public data.

Also, the processor may further include a conversion module that converts the Excel file having the dynamic layout into a file in a data format of CSV, XML, and JSON at a request of a data format of the user terminal.

Besides, the processor may further include a determination module that determines a corresponding compressed file for transmitting the Excel file having the dynamic layout to the user terminal through the communication unit from among compressed files predetermined for each data capacity, when a data capacity of the Excel file having the dynamic layout exceeds a predetermined level.

According to an embodiment, a big data platform-based integrated management method of an integrated management device based on a big data platform includes extracting a text and a table in an image file of pieces of public data and a text and a table in a PDF file of the pieces of public data among big data, which is received from a big data collection device through AI OCR, inputting unstructured data related to the text and the table in the image file and the text and the table in the PDF file into an AI model, and performing preprocessing to store structured data in a form of key and value, which is learned and output based on the AI model, in a relational database, performing an integrated search on unstructured data and structured data in a requested public data based on SDK and RestfulAPI when a search request for the requested public data among the pieces of public data is received from a user terminal, and displaying the found public data through the user terminal.

Moreover, the performing of the integrated search may further include performing an integrated search linked to a search engine on the unstructured data and the structured data in the found public data based on the SDK and the RestfulAPI.

Furthermore, the integrated management method may further include generating an Excel file having a dynamic layout with respect to structured data corresponding to the text and the table in the image file and the text and the table in the PDF file in the found public data.

Also, the integrated management method may further include converting the Excel file having the dynamic layout into a file in a data format of CSV, XML, and JSON at a request of a data format of the user terminal.

Besides, the integrated management method may further include determining a corresponding compressed file for transmitting the Excel file having the dynamic layout to the user terminal from among compressed files predetermined for each data capacity, when a data capacity of the Excel file having the dynamic layout exceeds a predetermined level.

BRIEF DESCRIPTION OF THE FIGURES

The above and other objects and features will become apparent from the following description with reference to the following figures, wherein like reference numerals refer to like parts throughout the various figures unless otherwise specified, and wherein:

FIGS. 7 to 13 are diagrams showing an example of a process of displaying and managing public data found through a terminal of a user of FIG. 1.

DETAILED DESCRIPTION

Figure 1:
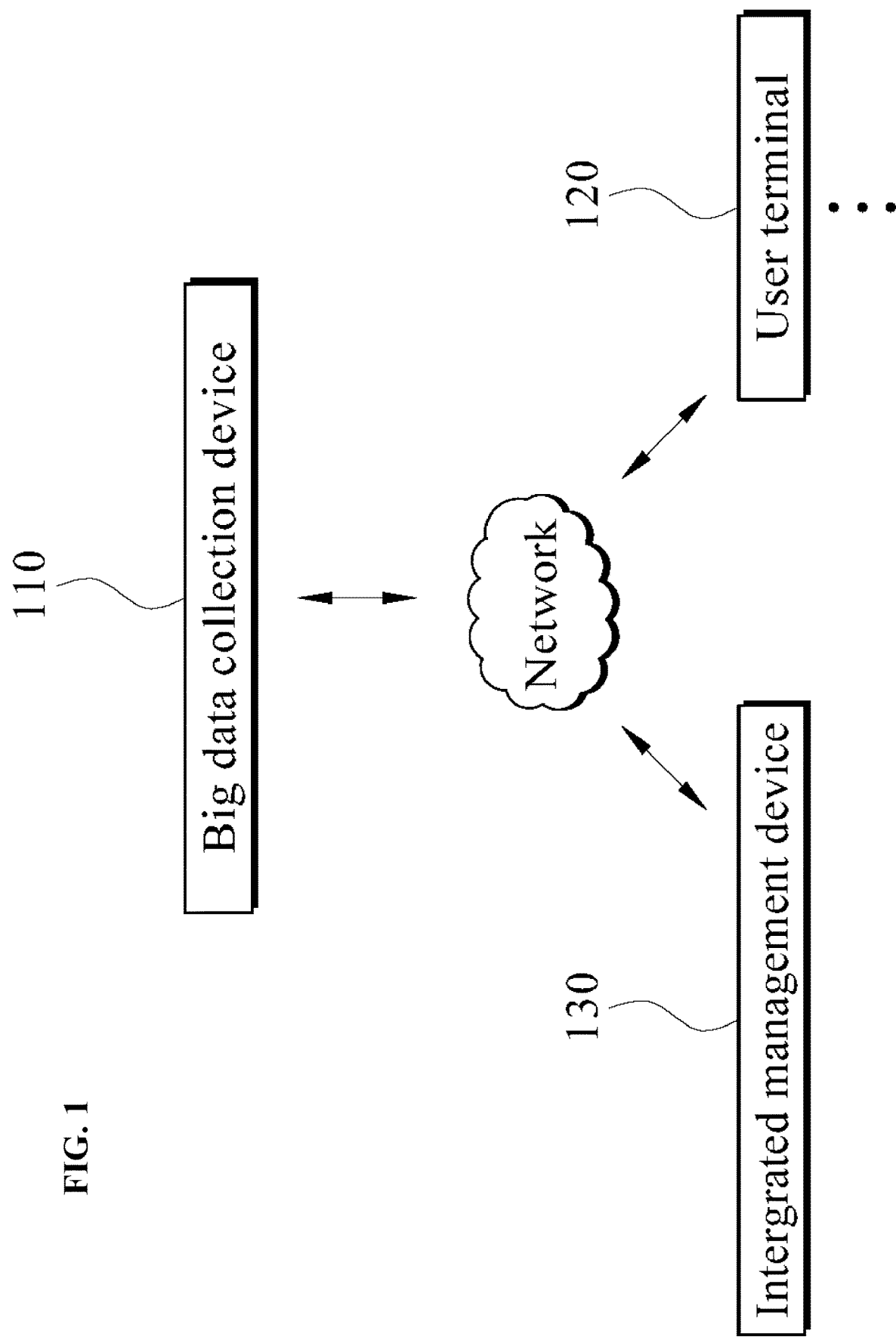
FIG. 1 is a diagram showing a big data platform-based integrated management system, according to an embodiment of the inventive concept.

The same reference numerals denote the same elements throughout the inventive concept. The inventive concept does not describe all elements of embodiments. Well-known content or redundant content in which embodiments are the same as one another will be omitted in a technical field to which the inventive concept belongs. A term such as 'unit, module, member, or block' used in the specification may be implemented with software or hardware. According to embodiments, a plurality of 'units, modules, members, or blocks' may be implemented with one component, or a single 'unit, module, member, or block' may include a plurality of components.

Throughout this specification, when it is supposed that a portion is "connected" to another portion, this includes not only a direct connection, but also an indirect connection. The indirect connection includes being connected through a wireless communication network.

Furthermore, when a portion "comprises" a component, it will be understood that it may further include another component, without excluding other components unless specifically stated otherwise.

Throughout this specification, when it is supposed that a member is located on another member "on", this includes not only the case where one member is in contact with another member but also the case where another member is present between two other members.

Terms such as 'first', 'second', and the like are used to distinguish one component from another component, and thus the component is not limited by the terms described above.

Unless there are obvious exceptions in the context, a singular form includes a plural form.

In each step, an identification code is used for convenience of description. The identification code does not describe the order of each step. Unless the context clearly states a specific order, each step may be performed differently from the specified order.

Hereinafter, operating principles and embodiments of the inventive concept will be described with reference to the accompanying drawings.

In this specification, a big data platform-based integrated management system according to an embodiment of the inventive concept includes all various devices capable of providing results to a user by performing arithmetic processing. For example, according to an embodiment of the inventive concept, the big data platform-based integrated management system may include all of a computer, a server, and a portable terminal, or may be in any one form.

Here, for example, the computer may include a notebook computer, a desktop computer, a laptop computer, a tablet PC, a slate PC, and the like, which are equipped with a web browser.

The server may process information by communicating with an external device and may include an application server, a computing server, a database server, a file server, a mail server, a proxy server, and a web server.

For example, the portable terminal may be a wireless communication device that guarantees portability and mobility, and may include all kinds of handheld-based wireless communication devices such as a smartphone, a personal communication system (PCS), a global system for mobile communication (GSM), a personal digital cellular (PDC), a personal handyphone system (PHS), a personal digital assistant (PDA), International Mobile Telecommunication (IMT)-2000, a code division multiple access (CDMA)-2000, W-Code Division Multiple Access (W-CDMA), and Wireless Broadband Internet terminal (Wibro) terminal, and a wearable device such as a timepiece, a ring, a bracelet, an anklet, a necklace, glasses, a contact lens, or a head-mounted device (HMD).

According to an embodiment of the inventive concept, a big data platform-based integrated management system may extract texts and tables in an image file of pieces of public data and texts and tables in a PDF file of the pieces of public data among big data received from a big data collection device through AI OCR, may input unstructured data related to the texts and tables in the image file and the texts and tables in the PDF file into an AI model, may perform preprocessing to store structured data in a form of key and value, which is learned and output based on the AI model, in a relational database, may perform an integrated search on unstructured data and structured data in the found public data based on SDK and RestfulAPI when a search request for one of the pieces of public data is received through a user terminal, and may display the found public data through the user terminal.

This big data platform-based integrated management system may efficiently perform a function of accurately extracting, identifying, and utilizing a text and a table in an image file and a PDF file. Moreover, the big data platform-based integrated management system may improve a system for data management and connection. Furthermore, the big data platform-based integrated management system may shorten work time by automating data collection and analysis. Besides, the big data platform-based integrated management system may systematically manage big data by processing the data into a desired form.

Hereinafter, the big data platform-based integrated management system will be described in detail.

Figure 2:
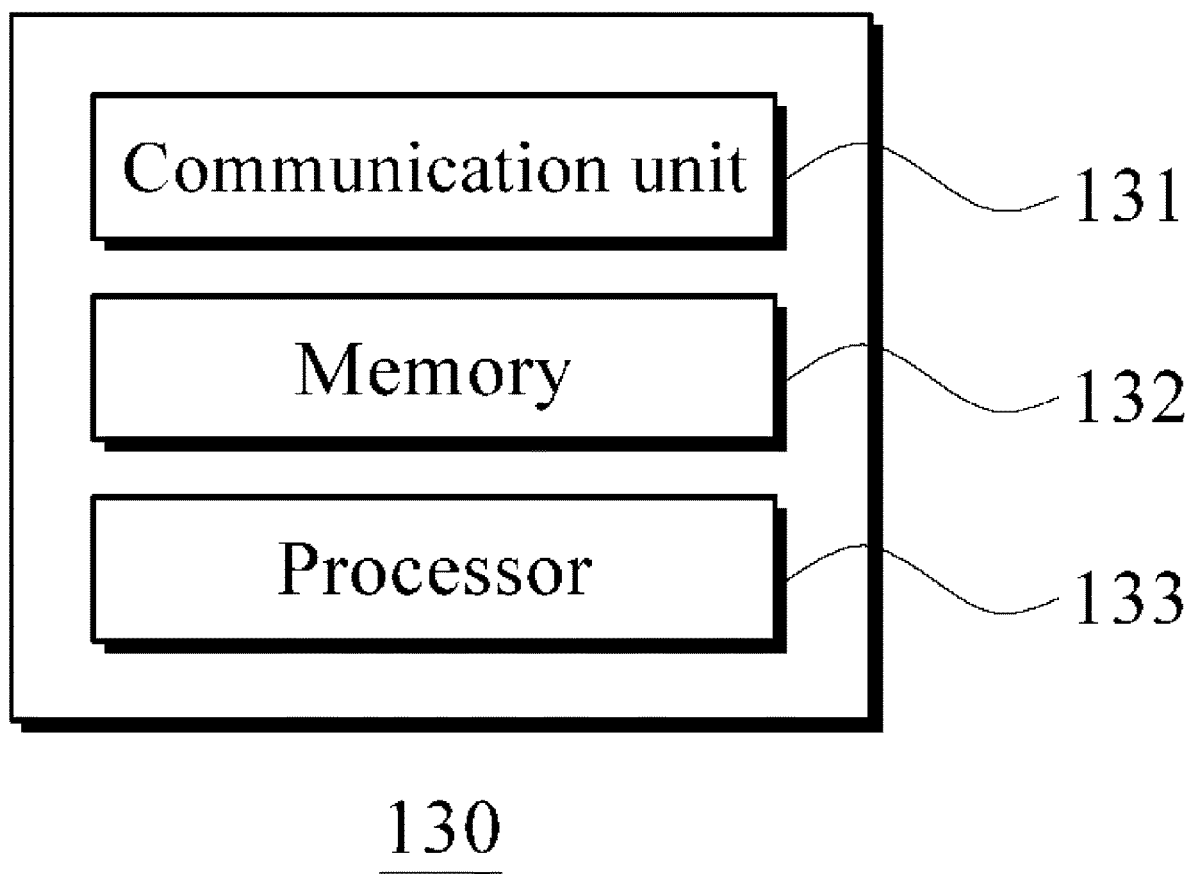
FIG. 2 is a diagram showing a configuration of a big data platform-based integrated management system of FIG. 1.

FIG. 1 is a diagram showing a big data platform-based integrated management system, according to an embodiment of the inventive concept. FIG. 2 is a diagram showing a configuration of a big data platform-based integrated management system of FIG. 1.

Referring to FIGS. 1 and 2, a big data platform-based integrated management system 100 may include a big data collection device 110, a user terminal 120, and an integrated management device 130.

The big data collection device 110 may collect big data from various industrial fields. In this case, the big data in various industrial fields may refer to big data in transportation, finance, culture, forestry, distribution and consumption, small and medium-sized enterprises, local economy, telecommunications, healthcare, environments, agricultural products, digital industrial innovation, life logs, fire safety, smart security, or marine and fisheries. Moreover, the big data collection device 110 may also collect interest data for each age group, interest data for each tendency, or the like. The big data collection device 110 may collect not only big data from various industrial fields, interest data for each age group, and interest data for each tendency, but also various pieces of data for efficiently sharing data. For example, the big data collection device 110 may be a Crawling, RSS, Open API, Streaming, FTP-based device, or the like.

The user terminal 120 of a user may make a request for the big data in various industrial fields to the integrated management device 130, and may display the big data in the corresponding industrial field, which is received from the integrated management device 130. In this case, the user may be a person engaged in transportation, finance, culture, forestry, distribution and consumption, small and medium-sized enterprises, local economy, telecommunications, healthcare, environments, agricultural products, digital industrial innovation, life logs, fire safety, smart security, or marine and fisheries.

The integrated management device 130 may perform operations related to integrated management based on a big data platform. The integrated management device 130 may include a communication unit 131, a memory 132, and a processor 133.

The communication unit 131 may communicate with the big data collection device 110 and the user terminal 120. Here, the communication unit 131 may receive the big data in various industrial fields, which is obtained from the big data collection device 110, and may receive the big data in the corresponding industrial field, which is requested by the user terminal 120.

Here, the communication unit 131 may include a wireless communication module for supporting various wireless communication methods such as Global System for Mobile (GSM) communication, Code Division Multiple Access (CDMA), Wideband Code Division Multiple Access (WCDMA), Universal Mobile Telecommunication System (UMTS), Time Division Multiple Access (TDMA), Long Term Evolution (LTE), 4G, 5G, and 6G in addition to a wifi module and Wireless broadband module.

The memory 132 may store data regarding an algorithm for controlling an operation of components within the present device, or a program for executing the algorithm. In addition, the at least one processors 133 may perform the above-described operations by using the data stored in the memory 132. Here, each of the memory 132 and the processor 133 may be implemented as separate chips. Moreover, the memory 132 and the processor 133 may be implemented as a single chip.

The memory 132 may store data that supports various functions of the present device, and a program for operations of the processor 133, may store input/output data, and may store a plurality of application programs (or applications) running on the present device, pieces of data for operations of the present device, and instructions. At least part of the application programs may be downloaded from an external server through wireless communication.

The memory 132 may include the type of a storage medium of at least one of a flash memory type, hard disk type, a solid state disk (SSD) type, a silicon disk drive (SDD) type, a multimedia card micro type, a memory of a card type (e.g., SD memory, XD memory, or the like), a random access memory (RAM), a static random access memory (SRAM), a read-only memory (ROM), an electrically erasable programmable read-only memory (EEPROM), a programmable read-only memory (PROM), a magnetic memory, a magnetic disk, and an optical disc. Furthermore, the memory 132 may be separate from the present device, but may be a database connected by wire or wirelessly.

The processor 133 may be electrically connected to the communication unit 131 and may control operations related to integrated management based on a big data platform.

Figure 3:
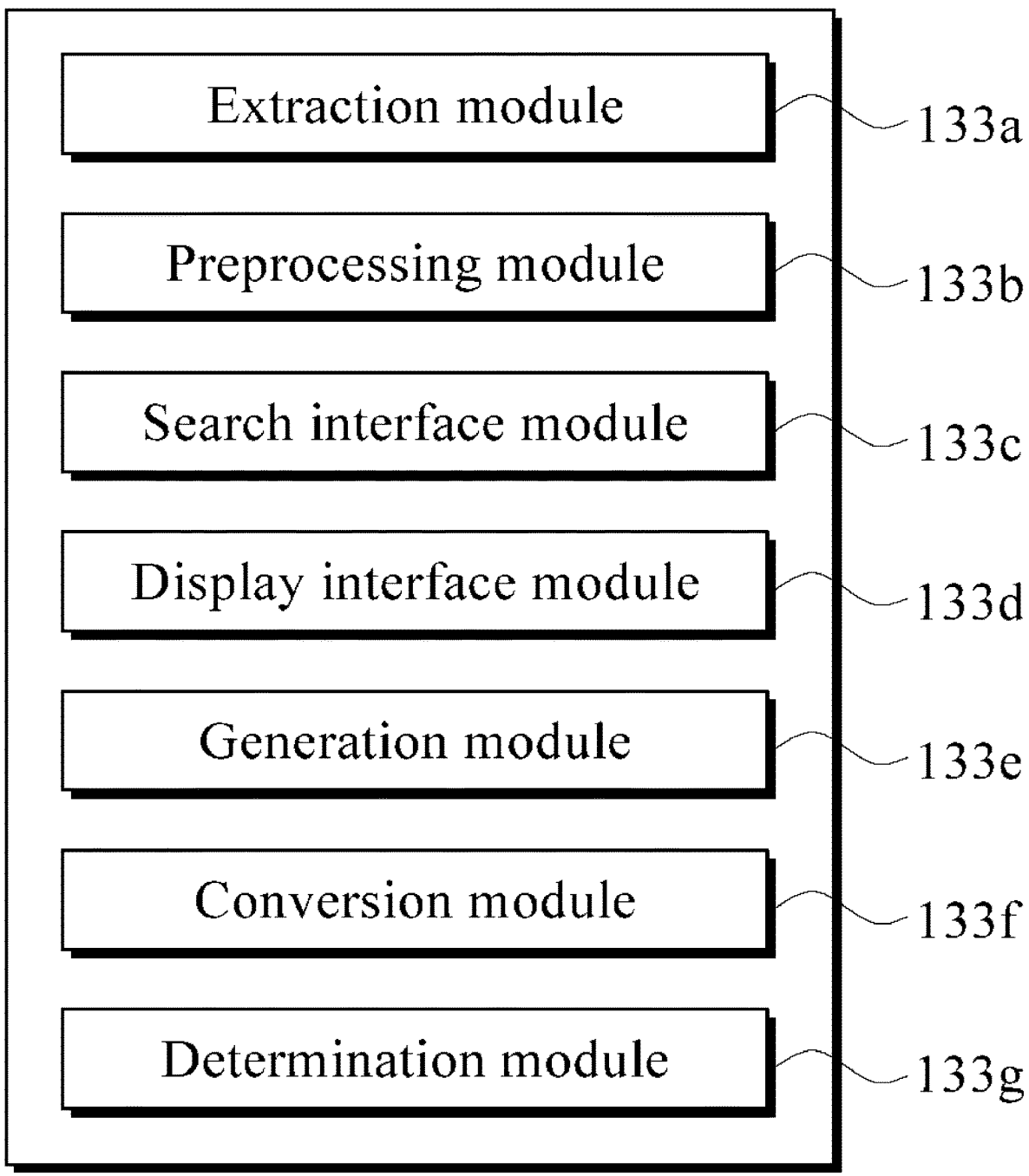
FIG. 3 is a diagram showing a configuration of a processor of FIG. 2.

FIG. 3 is a diagram showing a configuration of a processor of FIG. 2.

Referring to FIG. 3, the processor 133 may include an extraction module 133a, a preprocessing module 133b, a search interface module 133c, a display interface module 133d, a generation module 133e, a conversion module 133f, and a determination module 133g.

Among big data received from the big data collection device 110, the extraction module 133a may extract texts and tables in an image file of pieces of public data and texts and tables in a PDF file of the pieces of public data through the communication unit 131 through AI OCR.

In this case, the pieces of public data may include various pieces of environment-related data such as temperature data by time zone for each region, humidity data by time zone for each region, fine dust data by time zone for each region, carbon dioxide data by time zone for each region, illuminance data by time zone for each region, ultraviolet ray data by time zone for each region, virus-related data by time zone for each region, noise data in daily life by time zone for each region, vibration data in daily life by time zone for each region, traffic noise data by time zone for each region, traffic vibration data by time zone for each region, and fire data by time zone for each region.

The preprocessing module 133b may input unstructured data related to the texts and tables in the image file and the texts and tables in the PDF file into an AI model, and may perform preprocessing to store structured data in a form of key and value, which are learned and output based on the AI model, in a relational database.

When a search request for any one of the pieces of public data is received from the user terminal 120, the search interface module 133c may perform an integrated search on the unstructured data and the structured data in the requested public data based on SDK and RestfulAPI. In this case, the search interface module 133c may perform an integrated search linked to a search engine on the unstructured data and the structured data in the requested public data based on SDK and RestfulAPI.

The display interface module 133d may display the found public data through the user terminal 120. In this case, the user terminal 120 may display various environment-related information such as temperature by time zone for each region, humidity by time zone for each region, fine dust levels by time zone in each region, carbon dioxide levels by time zone in each region, illumination levels by time zone for each region, ultraviolet ray levels by time zone for each region, virus outbreak situations by time zone in each region, noise levels in daily life by time zone in each region, vibration levels in daily life by time zone for each region, traffic noise levels by time zone for each region, traffic vibration levels by time zone for each region, or fire levels by time zone for each region.

The generation module 133e may generate an Excel file having a dynamic layout with respect to structured data corresponding to the texts and tables in the image file and the texts and tables in the PDF file in the found public data.

The conversion module 133f may convert the Excel file having a dynamic layout into a file in a data format of CSV, XML, and JSON at a request of a data format of the user terminal 120.

When the data capacity of the Excel file with a dynamic layout exceeds a predetermined level, the determination module 133g may determine the corresponding compressed file for transmitting the Excel file with the dynamic layout to the user terminal 120 through the communication unit 131 from among the compressed files predetermined for each data capacity.

Figure 4:
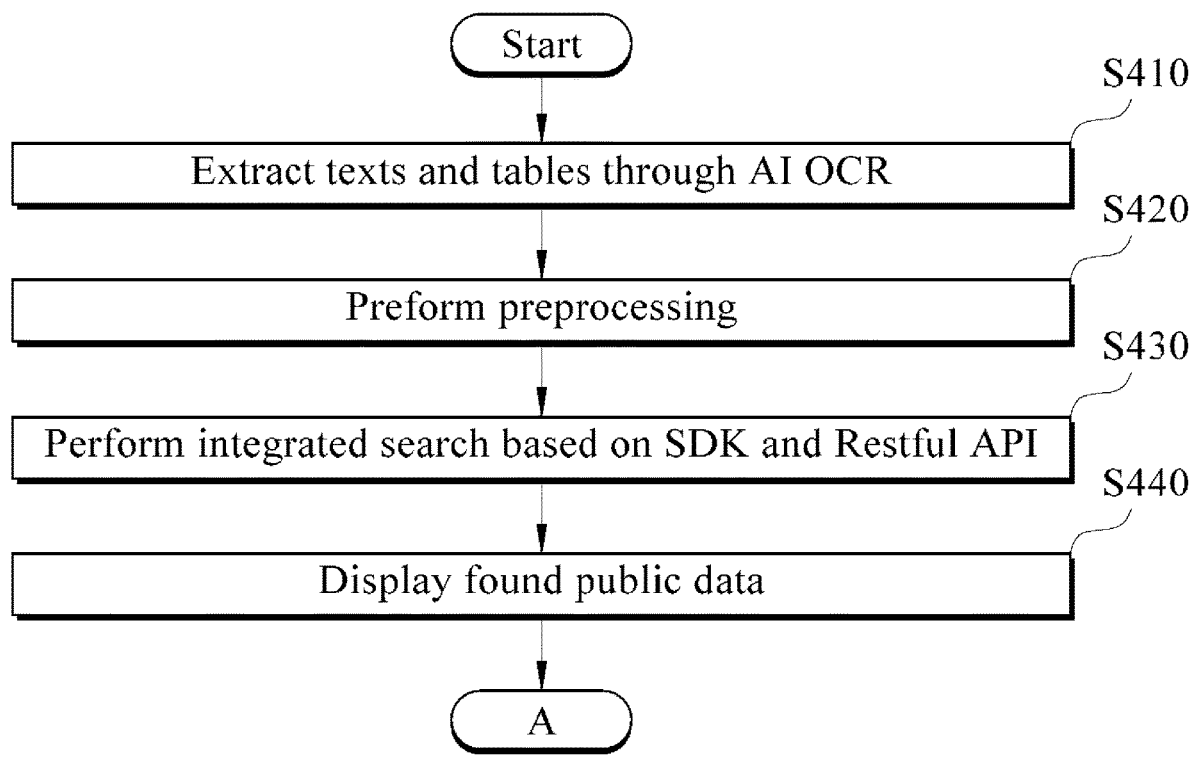
FIGS. 4 and 5 are flowcharts showing an integrated management method based on a big data platform, according to an embodiment of the inventive concept.
Figure 5:
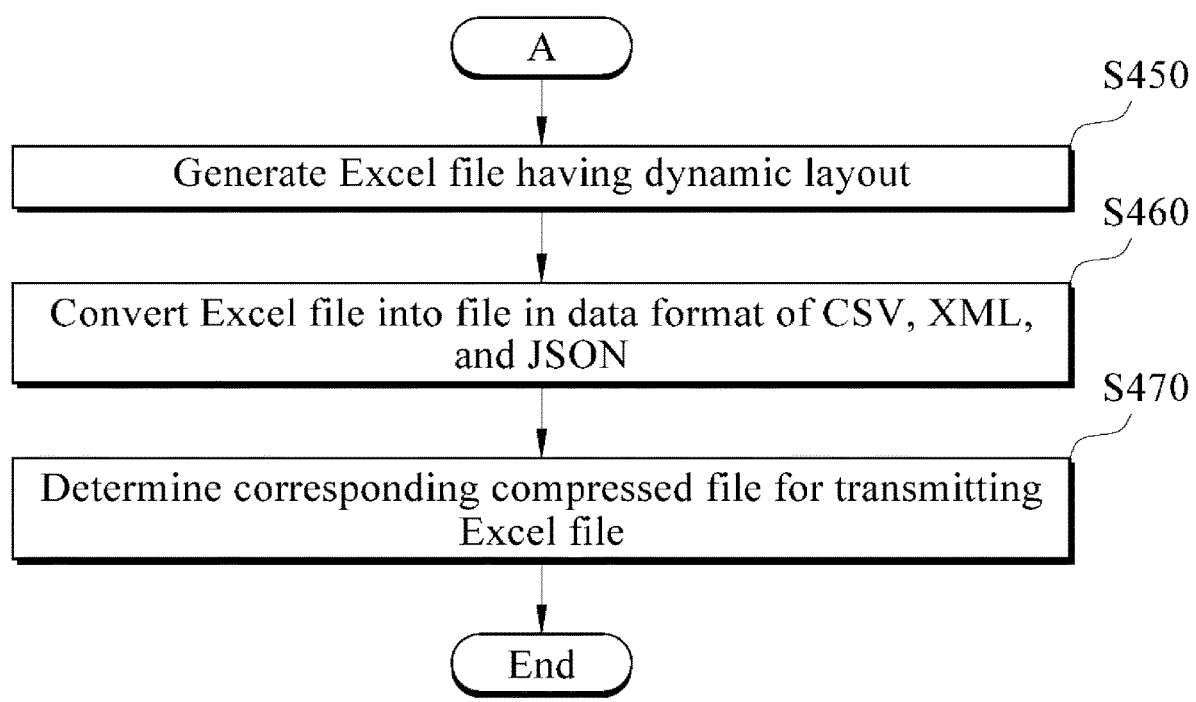

FIGS. 4 and 5 are flowcharts showing an integrated management method based on a big data platform, according to an embodiment of the inventive concept.

Figure 6:
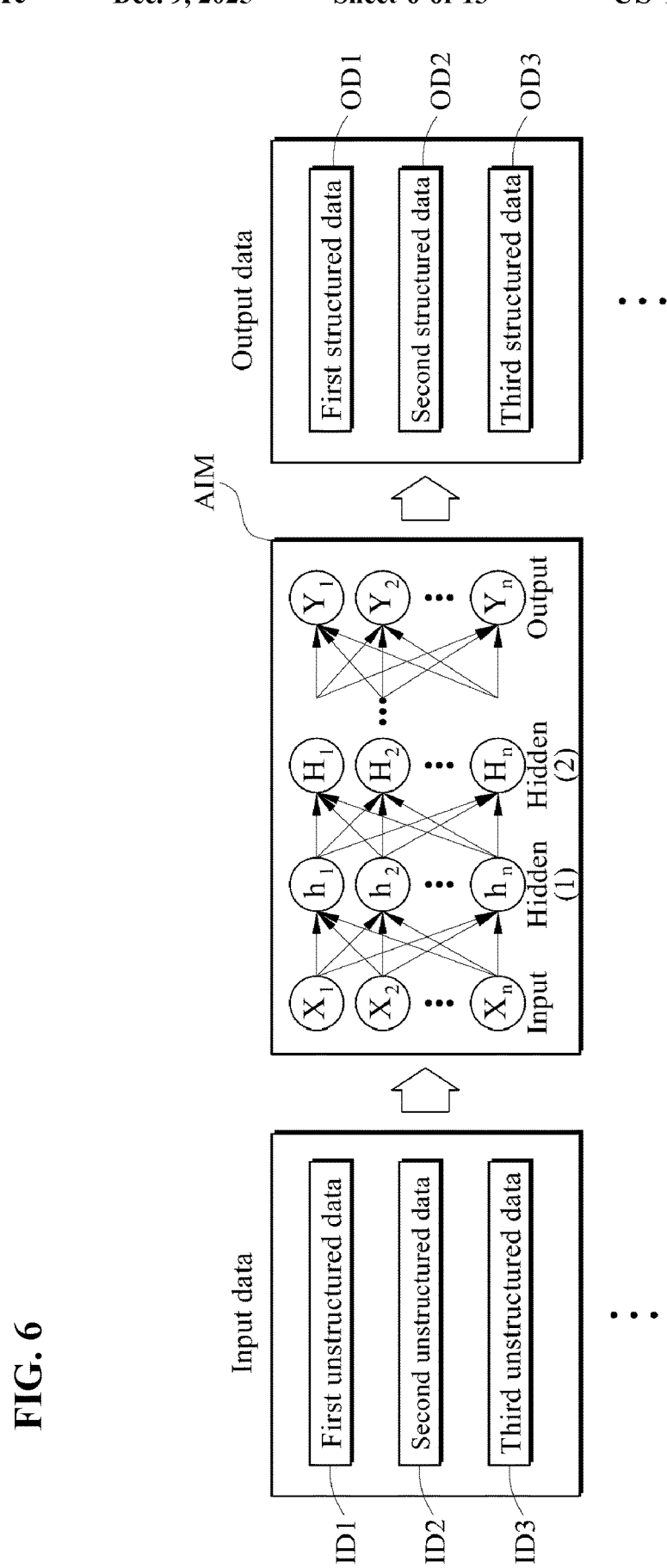
FIG. 6 is a diagram showing structured data in a form of key and value, which are learned and output by inputting unstructured data, based on an AI model of the processor of FIG. 2.

FIG. 6 is a diagram showing structured data in a form of key and value, which are learned and output by inputting unstructured data, based on an AI model of the processor of FIG. 2. FIGS. 7 to 13 are diagrams showing an example of a process of displaying and managing public data found through a terminal of a user of FIG. 1.

First of all, referring to FIGS. 4 and 5, an integrated management method based on a big data platform may include an extraction step S410, a preprocessing step S420, a provision step S430, a display step S440, a generation step S450, a conversion step S460, and a determination step S470.

The extraction step may extract texts and tables in an image file of pieces of public data and texts and tables in a PDF file of the pieces of public data through the extraction module 133a by using AI OCR among big data received from the big data collection device 110 (S410). In this case, the big data collection device 110 may collect the big data based on ETL, FTP, Crawling, RSS, Streamig, Open API, or the like. Here, the extraction module 133a may extract a first text and a first table in the image file of the pieces of public data, and a second text and a second table in the PDF file of the pieces of public data. Moreover, the extraction module 133a may extract a third text and a third table in a HWP file of the pieces of public data through AI OCR. At this time, the first text and the first table in the image file, the second text and the second table in the PDF file, and the third text and the third table in the HWP file may be stored in a data warehouse DW, a data lake, and an index DB.

The preprocessing step may input unstructured data related to the first text and the first table in the image file, unstructured data related to the second text and the second table in the PDF file, and unstructured data related to the third text and the third table in the HWP file into an AI model, and may perform preprocessing to store structured data in a form of key and value, which are learned and output based on the AI model, in a relational database through the preprocessing module 133b (S420). Here, as illustrated in FIG. 6, the preprocessing module 133b may input first unstructured data ID1 related to the first text and the first table, second unstructured data ID2 related to the second text and the second table, and third unstructured data ID3 related to the third text and the third table into an AI model (AIM). In this case, the preprocessing module 133b may output result values of first structured data OD1 related to the first text and the first table in a form of key and value, second structured data OD2 related to the second text and the second table in a form of key and value, and third structured data OD3 related to the third text and the third table in a form of key and value, which are learned and found based on the AI model AIM.

The AI model AIM may perform construction and reinforcement learning on the first unstructured data ID1 related to the various first texts and the various first tables, the second unstructured data ID2 related to the various second texts and the various second tables, and the third unstructured data ID3 related to the various third texts and the various third tables as a training data set by using a CNN algorithm or an RNN algorithm. At this time, the AI model AIM may automatically classify data and may learn an unstructured layout.

To identify the first structured data OD1 related to the first text and the first table in a form of key and value, the second structured data OD2 related to the second text and the second table in a form of key and value, and the third structured data OD3 related to the third text and the third table in a form of key and value, a user may enter the first unstructured data ID1 related to the first text and the first table, the second unstructured data ID2 related to the second text and the second table, and the third unstructured data ID3 related to the third text and the third table by using the user terminal 120. That is, the preprocessing module 133b may output the first structured data OD1, the second structured data OD2, and the third structured data OD3 in a form of key and value, which are learned and found based on the first unstructured data ID1, the second unstructured data ID2, and the third unstructured data ID3 that are entered by using the user terminal 120.

Here, the preprocessing module 133b may store structured data in the form of key and value in a relational database based on the learned layout. Furthermore, the preprocessing module 133b may perform an automatic validation check function on constraints and value quality based on the learned layout.

In this case, the preprocessing module 133b may learn a layout through initial data learning and may generate a dynamic metadata management prototype of an undefined layout based on the learned layout. In other words, the preprocessing module 133b may configure and store the learned layout-based metadata management prototype as a user keyset in a form of a dynamic map, and may store data in a form capable of being served when searching for and providing data through the keyset thus dynamically configured. Here, the preprocessing module 133b may generate a key value that satisfies data standards in connection with standard terms, words, and domain dictionaries. In this case, when generating the keyset, the preprocessing module 133b may edit a comment layout and a key comment, may add and delete a key, may rearrange the key order, and may store a layout.

Because the preprocessing module 133b may automatically generate a data set for converting unstructured data into structured data, a time required to generate a training data set may be reduced.

The provision step may perform an integrated search on the unstructured data and the structured data in the requested public data based on SDK and RestfulAPI through the search interface module 133c when a search request for any one of pieces of public data is received from the user terminal 120 (S430).

Here, the search interface module 133c may perform an integrated search linked to a search engine on the unstructured data and the structured data in the requested public data based on SDK and RestfulAPI, and may provide the found result to the user terminal 120. In this case, the search interface module 133c may perform an image integrated search function linked to a search engine through a search linkage module based on search linkage standards. That is, the search interface module 133c may be designed as a standard specification capable of being used in other systems for the scalability of search linkage with the other systems. In addition, the search interface module 133c may search for the unstructured original data, and may search for the structured data. In this case, the search interface module 133c may perform a search function based on the structured data, and may perform a detailed search function of the unstructured original data. Moreover, the search interface module 133c may perform an integrated search function based on metadata of image data and texts extracted through AI OCR. Furthermore, the search interface module 133c may perform a function of utilizing data collected through linking to a separate system such as a search portal.

The display step may display the found public data on the user terminal 120 through the display interface module 133d (S440). In this case, the user terminal 120 may display various environment-related information such as temperature by time zone for each region, humidity by time zone for each region, fine dust levels by time zone in each region, carbon dioxide levels by time zone in each region, illumination levels by time zone for each region, ultraviolet ray levels by time zone for each region, virus outbreak situations by time zone in each region, noise levels in daily life by time zone in each region, vibration levels in daily life by time zone for each region, traffic noise levels by time zone for each region, traffic vibration levels by time zone for each region, or fire levels by time zone for each region.

The generation step may generate an Excel file having a dynamic layout with respect to structured data corresponding to the texts and tables in the image file and the texts and tables in the PDF file in the found public data through the generation module 133e (S450). In this case, the generation module 133e may automatically generate the Excel file for recognizing various layouts. Here, the generation module 133e may automatically generate the extracted text and the extracted table in a format of the Excel file.

The conversion step may convert the Excel file having a dynamic layout into a file in a data format of CSV, XML, and JSON at a request of data format of the user terminal 120 through the conversion module 133f (S460). Here, the conversion module 133f may convert Excel files into files in various data formats of CSV, XML, and JSON that satisfy metadata transmission specifications provided by a big data platform. In this case, the conversion module 133f may provide an API linked to the big data platform. In other words, the conversion module 133f may perform a function of analyzing data by using a dynamic MAP-based formalization technique for linking to the big data platform, converting the data into data in a usable form, and linking the converted data.

The determination step may determine the corresponding compressed file for transmitting the Excel file having the dynamic layout to the user terminal 120 through the communication unit 131 from among the compressed files predetermined for each data capacity through the determination module 133g when the data capacity of the Excel file having a dynamic layout exceeds a predetermined level (S470). For example, when a first condition that the data capacity of the Excel file having a dynamic layout is greater than a first reference data capacity thus predetermined and smaller than a second standard data capacity is satisfied, the determination module 133g may determine one first compressed file linked to the first condition. In this case, the determination module 133g may compress the Excel file having a dynamic layout as the one first compressed file, and may provide the one first compressed file to the user terminal 120 through the communication unit 131. For another example, when a second condition that the data capacity of an Excel file having a dynamic layout is greater than the second reference data capacity thus predetermined and smaller than a third standard data capacity is satisfied, the determination module 133g may determine two second compressed files linked to the second condition. In this case, the determination module 133g may compress the Excel file having a dynamic layout as the two second compressed files, and may provide the two second compressed files to the user terminal 120 through the communication unit 131.

Additionally, the determination module 133g may provide files in accordance with specifications for large-capacity transmission files provided by the big data platform. In other words, the determination module 133g may provide files in accordance with specifications for dynamic metadata transmission of unstructured metadata and structured data, and may provide the files in a usable data format by using dynamic MAP. In this case, to check the integrity of the files, the determination module 133g may also issue and manage a Universally Unique IDentifier (UUID). The determination module 133g may provide specifications for linking to data lake and data warehouse (DW) of the big data platform and may provide a transmission function, thereby reducing human and time operational burden and increasing efficiency.

In the meantime, according to an embodiment of the inventive concept, the extraction module 133a may extract texts in an image file of public data among big data, which is received from the big data collection device 110 through the communication unit 131, by using AI OCR. In this case, the preprocessing module 133b may input a text in the image file of public data into the AI model AIM, and may perform preprocessing to store structured data in a form of key and value, which is learned and output based on the AI model AIM, in a relational database. Here, when a search request for any one of the pieces of public data is received from the user terminal 120, the search interface module 133c may perform an integrated search on the unstructured data and the structured data in the requested public data based on SDK and RestfulAPI, and may provide the found result to the user terminal 120.

Figure 7:
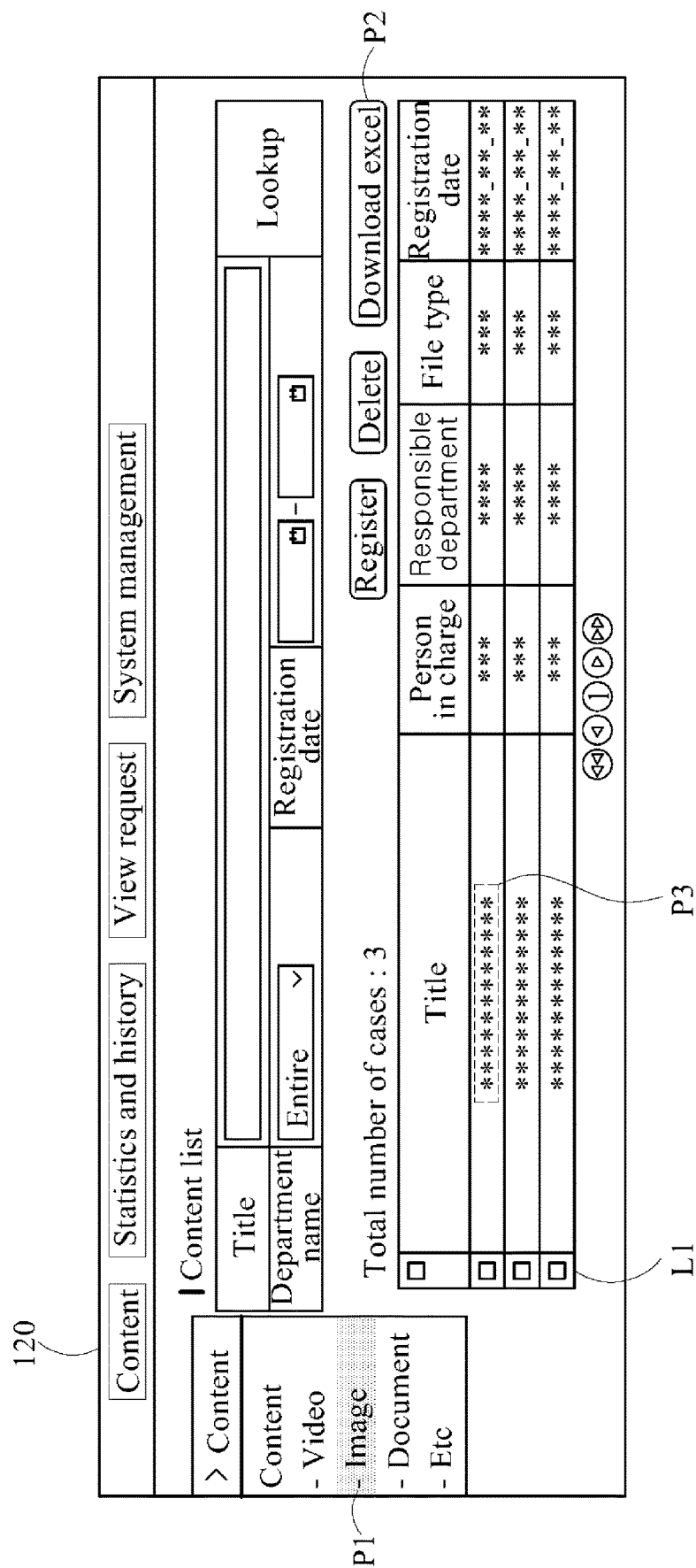
Figure 8:
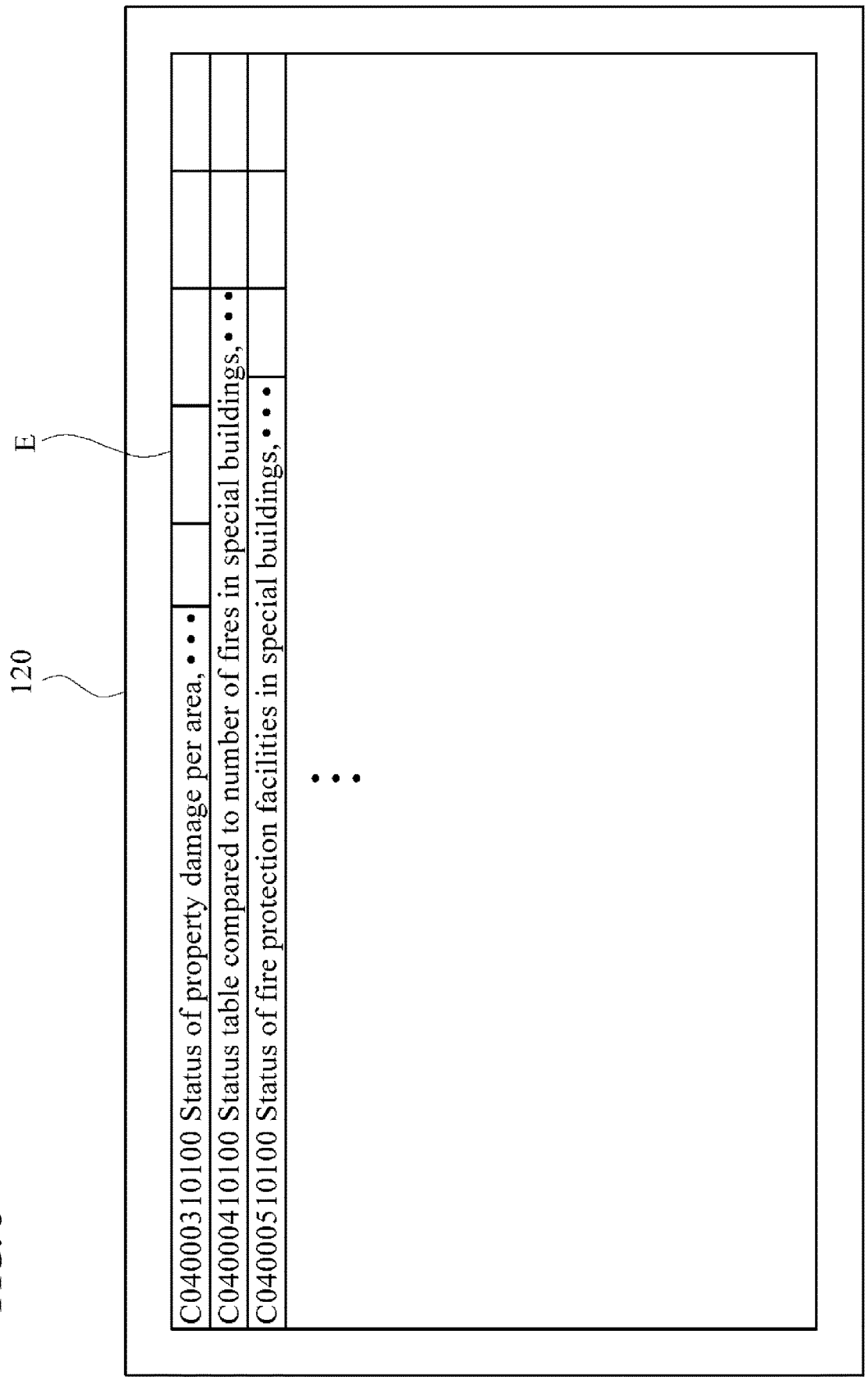

For example, as shown in FIG. 7, the user terminal 120 may display the found public data. Here, when a user selects a first UI P1, the user terminal 120 may display a list L1 of the corresponding public data. In this case, when the user selects a second UI P2, as shown in FIG. 8, the user terminal 120 may display a list of the corresponding public data in a form of an Excel file 'E'.

Figure 10:
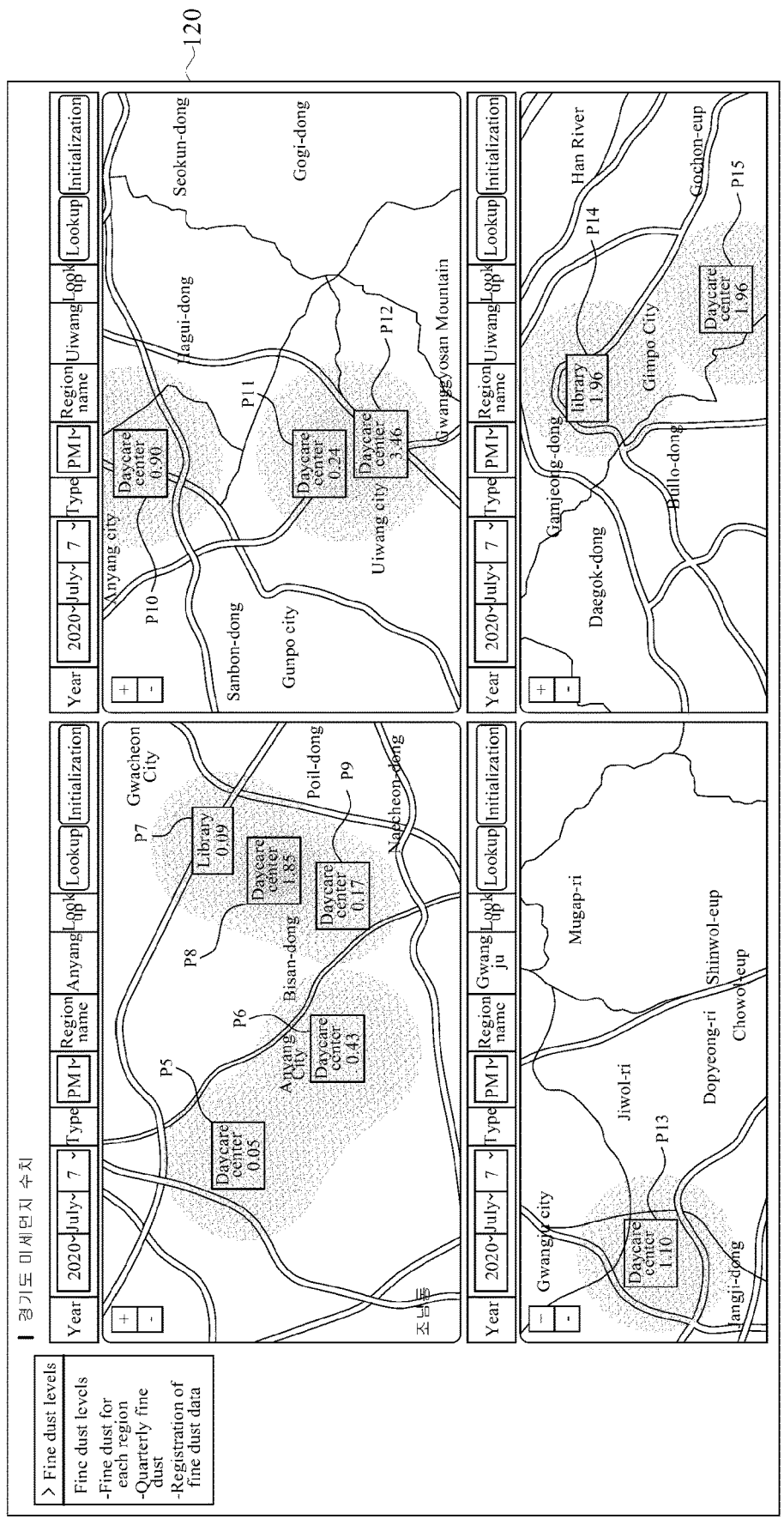

For another example, when the user selects a third UI P3 as shown in FIG. 7, the user terminal 120 may display a description table L2 of a detailed page of content as shown in FIG. 9. In this case, when the user selects a fourth UI P4, as shown in FIG. 10, the user terminal 120 may display fine dust levels of representative buildings by date and region in a map form. Here, when the user selects any one of fifth to fifteenth UIs P5 to P15, the user terminal 120 may display the fine dust levels of nearby buildings.

Figure 11:
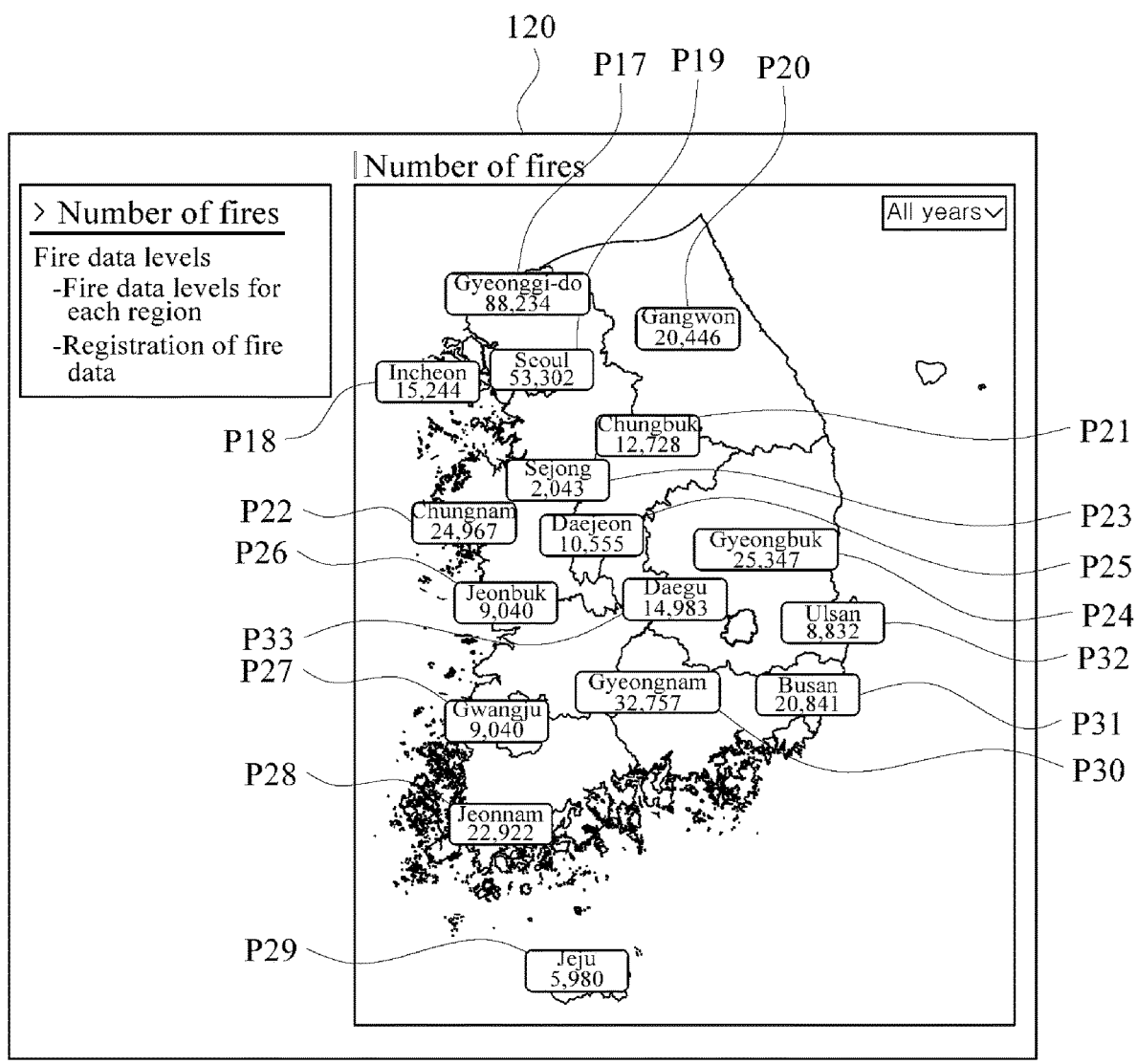

For still another example, when the user selects a sixteenth UI P16 as shown in FIG. 9, the user terminal 120 may display fire data levels for each region in the map form as shown in FIG. 11. In this case, when the user selects one of seventeenth to 33rd UIs P17 to P33, the user terminal 120 may also display fire data levels for detailed cities.

Figure 12:
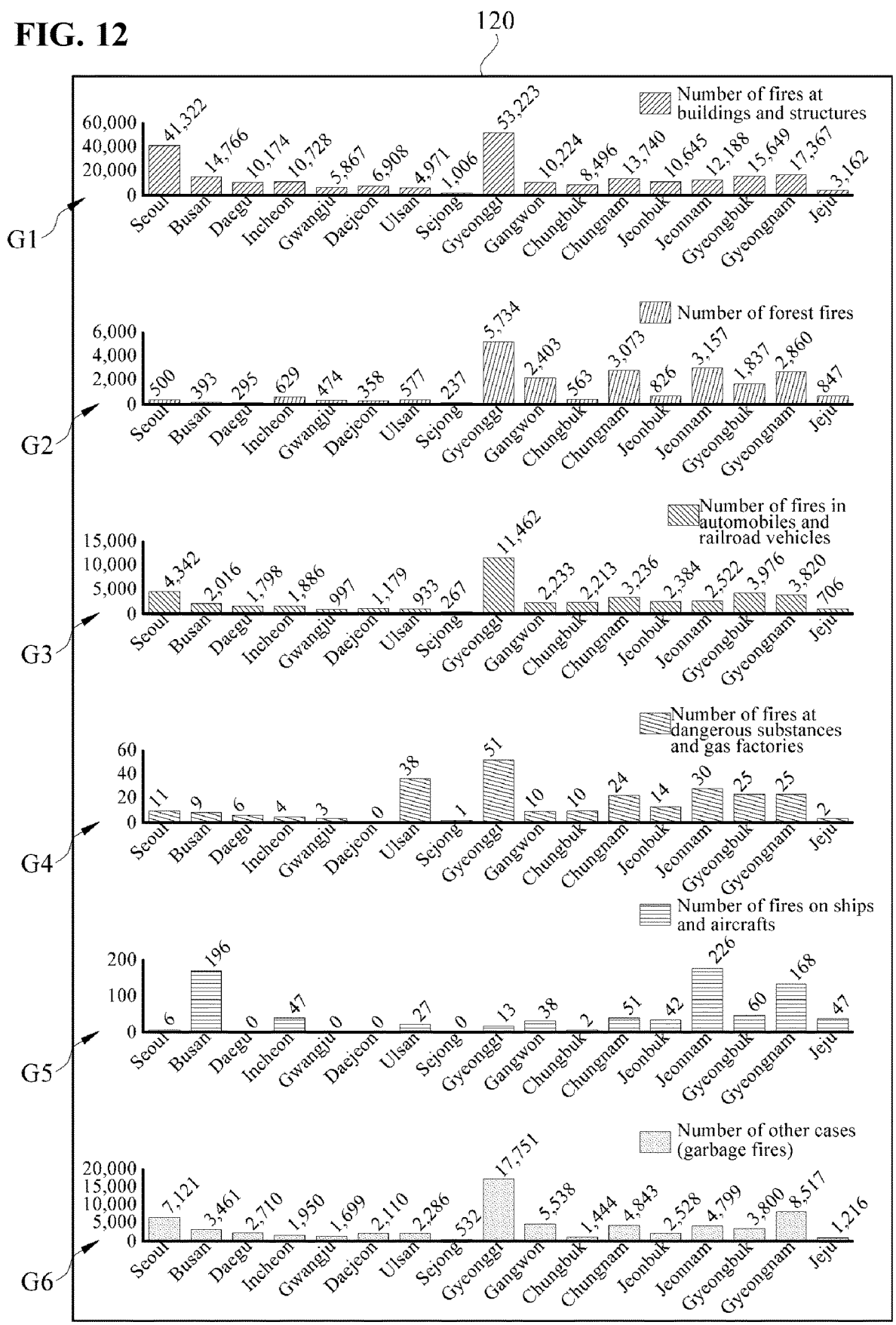

For yet another example, when the user selects the sixteenth UI P16 as shown in FIG. 9, the user terminal 120 may display information about fire data values for each region in a graph form as shown in FIG. 12. Here, the user terminal 120 may display the number of fires in building structures for each region in a graph G1, may display the number of forest fires for each region in a graph G2, may display the number of fires in automobiles and railroad vehicles for each region in a graph G3, may display the number of fires at dangerous substances and gas factories for each region in a graph G4, may display the number of fires on ships and aircrafts for each region in a graph G5, and may display the number of garbage fires for each region in a graph G6.

For yet another example, as shown in FIG. 13, the user may manage content for public data by using the user terminal 120. In this case, the user may register the content for public data.

According to an embodiment of the inventive concept, an integrated management device based on a big data platform may be provided to automatically collect big data based on AI and to link to public data.

According to an embodiment of the inventive concept, all pieces of data may be stored in a data lake through linking to original data and metadata, and big data may be analyzed and utilized based on all the pieces of data.

At least one component may be added or deleted to correspond to the performance of the components illustrated in FIGS. 1 to 3 and 6 to 12. Furthermore, it will be easily understood by those skilled in the art that mutual locations of the components may be changed to correspond to the performance or structure of the system.

FIGS. 4 and 5 illustrate that operations are performed sequentially. However, this is merely illustrative of the technical idea of the inventive concept. Those skilled in the art to which an embodiment of the inventive concept belongs may apply various modifications and variations by changing and performing the order illustrated in FIGS. 4 and 5 or performing one or more operations among a plurality of operations in parallel without departing from the essential characteristics of an embodiment of the inventive concept. The embodiment in FIGS. 4 and 5 is not limited to a time-series order.

Meanwhile, the disclosed embodiments may be implemented in a form of a recording medium storing instructions executable by a computer. The instructions may be stored in a form of program codes, and, when executed by a processor, generate a program module to perform operations of the disclosed embodiments. The recording medium may be implemented as a computer-readable recording medium.

The computer-readable recording medium may include all kinds of recording media in which instructions capable of being decoded by a computer are stored. For example, there may be read only memory (ROM), random access memory (RAM), magnetic tape, magnetic disk, flash memory, optical data storage device, and the like.

Disclosed embodiments are described above with reference to the accompanying drawings. One ordinary skilled in the art to which the inventive concept belongs will understand that the inventive concept may be practiced in forms other than the disclosed embodiments without altering the technical ideas or essential features of the inventive concept. The disclosed embodiments are examples and should not be construed as limited thereto.

According to the above-mentioned problem solving means of the inventive concept, a device may efficiently perform a function of accurately extracting, identifying, and utilizing texts and tables in image files and PDF files.

According to the above-mentioned problem solving means of the inventive concept, a device may improve a system for data management and linkage.

According to the above-mentioned problem solving means of the inventive concept, a device may shorten work time by automating data collection and analysis.

According to the above-mentioned problem solving means of the inventive concept, a device may systematically manage big data by processing data into data in a desired form.

Effects of the inventive concept are not limited to the effects mentioned above, and other effects not mentioned will be clearly understood by those skilled in the art from the following description.

While the inventive concept has been described with reference to embodiments, it will be apparent to those skilled in the art that various changes and modifications may be made without departing from the spirit and scope of the inventive concept. Therefore, it should be understood that the above embodiments are not limiting, but illustrative.

What is claimed is:

1. An integrated management device based on a big data platform, the integrated management device comprising:
a processor configured to:
extract a text and table in an image file of pieces of public data and a text and table in a Portable Document Format (PDF) file of the pieces of public data among big data, which is received from a big data collection device, by using Artificial intelligence (AI) Optical Character Recognition (OCR);
input unstructured data related to the text and table in the image file and the text and table in the PDF file into an AI model, acquire structured data that is learned and outputted by the AI model in response to the unstructured data inputted to the AI model, and store the structured data in a relational database in a key and value form;
perform an integrated search on the unstructured data and the structured data in a requested public data based on Software Development Kit (SDK) and Representational State Transfer Application Programming Interface (RESTful API) when a search request for the requested public data among the pieces of public data is received from a user terminal;
obtain found public data in response to the integrated search being performed wherein the unstructured data and the structured data is in the found public data; and
control the user terminal to display the found public data on the user terminal.

2. The integrated management device of claim 1, wherein the processor is further configured to perform the integrated search linked to a search engine on the unstructured data and the structured data in the found public data based on the SDK and the RESTful API.

3. The integrated management device of claim 2, wherein the processor is further configured to further includes: a generation module configured to generate an Excel file having a dynamic layout with respect to the structured data in the found public data.

4. The integrated management device of claim 3, wherein the processor is further configured to:
convert the Excel file having the dynamic layout into a file in a data format of Comma-Separated Values (CSV), extensible Markup Language (XML), and JavaScript Object Notation (JSON) at a request of a data format of the user terminal.

5. The integrated management device of claim 4, wherein the processor is further configured to:
determine a corresponding compressed file for transmitting the Excel file having the dynamic layout to the user terminal, from among compressed files predetermined for each data capacity, when a data capacity of the Excel file having the dynamic layout exceeds a predetermined level.

6. A big data platform-based integrated management method of an integrated management device based on a big data platform, the method comprising:
extracting a text and table in an image file of pieces of public data and a text and table in a Portable Document Format (PDF) file of the pieces of public data among big data, which is received from a big data collection device, by using Artificial intelligence (AI) Optical Character Recognition (OCR);
inputting unstructured data related to the text and table in the image file and the text and table in the PDF file into an AI model, acquire structured data that is learned and outputted by the AI model in response to the unstructured data inputted to the AI model, and store the structured data in a relational database in a key and value form;
performing an integrated search on the unstructured data and the structured data in a requested public data based on Software Development Kit (SDK) and Representational State Transfer Application Programming Interface (RESTful API) when a search request for the requested public data among the pieces of public data is received from a user terminal;
obtaining found public data in response to the integrated search being performed wherein the unstructured data and the structured data is in the found public data; and
displaying the found public data on the user terminal.

7. The method of claim 6, wherein the performing of the integrated search further includes:
performing the integrated search linked to a search engine on the unstructured data and the structured data in the found public data based on the SDK and the RESTful API.

8. The method of claim 7, further comprising:
generating an Excel file having a dynamic layout with respect to the structured data in the found public data.

9. The method of claim 8, further comprising:
converting the Excel file having the dynamic layout into a file in a data format of Comma-Separated Values (CSV), extensible Markup Language (XML), and JavaScript Object Notation (JSON) at a request of a data format of the user terminal.

10. The method of claim 9, further comprising:
determining a corresponding compressed file for transmitting the Excel file having the dynamic layout to the user terminal from among compressed files predetermined for each data capacity, when a data capacity of the Excel file having the dynamic layout exceeds a predetermined level.

* * * * *